(12) United States Patent
Langensiepen

(10) Patent No.: US 7,631,931 B2
(45) Date of Patent: Dec. 15, 2009

(54) DUAL PIVOTING ARMREST ARRANGEMENT FOR MOTOR VEHICLE

(75) Inventor: Eric Langensiepen, Beverly Hills, MI (US)

(73) Assignee: Kongsberg Automotive AB, Mullsjo (SE)

( * ) Notice: Subject to any disclaimer, the term of this patent is extended or adjusted under 35 U.S.C. 154(b) by 0 days.

(21) Appl. No.: 11/774,092

(22) Filed: Jul. 6, 2007

(65) Prior Publication Data
US 2009/0008982 A1 Jan. 8, 2009

(51) Int. Cl.
- A47C 17/04 (2006.01)
- A47C 7/62 (2006.01)
- B60N 2/46 (2006.01)

(52) U.S. Cl. .............. 297/115; 297/188.15; 297/411.32

(58) Field of Classification Search ................. 297/238, 297/188.15, 411.32, 411.3, 411.4, 411.38, 297/115, 117
See application file for complete search history.

(56) References Cited

U.S. PATENT DOCUMENTS

| | | | |
|---|---|---|---|
| 4,533,175 A | * | 8/1985 | Brennan ..................... 297/232 |
| 4,913,498 A | * | 4/1990 | Forlivio ...................... 297/488 |
| 5,100,199 A | * | 3/1992 | Vander Stel et al. ......... 297/238 |
| 5,188,423 A | | 2/1993 | Meiller et al. |
| 5,328,233 A | * | 7/1994 | Maule ........................ 297/115 |
| 5,390,976 A | * | 2/1995 | Doughty et al. ............. 297/115 |
| 6,073,996 A | * | 6/2000 | Hatsuta et al. .............. 297/113 |
| 7,261,381 B2 | * | 8/2007 | Tsai ........................... 297/488 |

FOREIGN PATENT DOCUMENTS

| | | | |
|---|---|---|---|
| EP | 670241 | | 9/1995 |
| GB | 2167949 A | * | 6/1986 |
| JP | 07-101277 | | 4/1995 |
| JP | 11-009385 | | 1/1999 |

* cited by examiner

Primary Examiner—Milton Nelson, Jr.
(74) Attorney, Agent, or Firm—Edwards Angell Palmer & Dodge LLP; Steven M. Jensen

(57) ABSTRACT

An armrest arrangement and a method of installing the armrest arrangement in a vehicle are provided, where the armrest arrangement can be arranged on a center console in a row of seats of the vehicle. The armrest arrangement includes upper and lower armrest units, each of the upper and lower armrest units being movable between a use position and a stowed position. When both the upper and lower armrest units are in the stowed position, the center console is usable as a middle seat. The upper and lower armrest units include armrests positioned at different heights to accommodate occupants of different heights, and the upper armrest unit is supported by the lower armrest unit, which is supported by a seat.

26 Claims, 8 Drawing Sheets

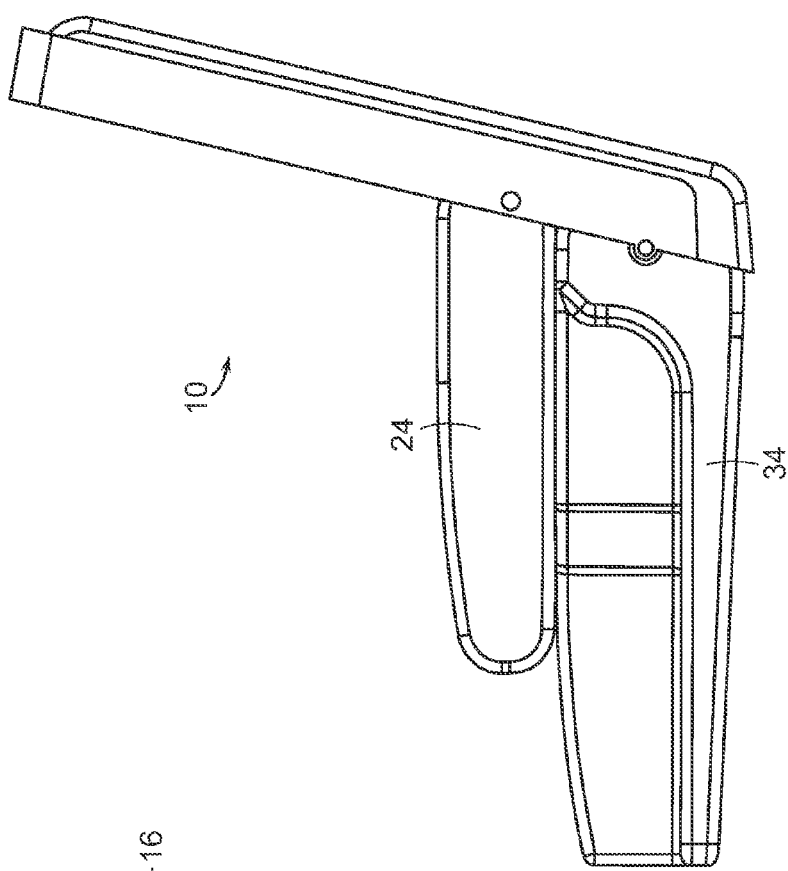
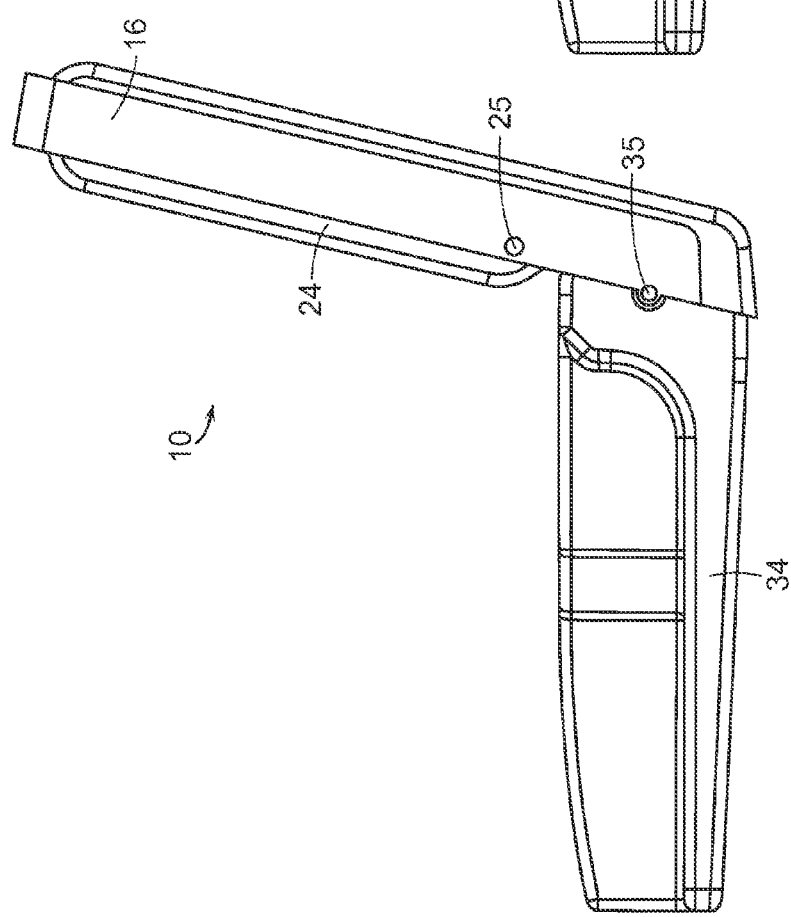
FIG. 4B
FIG. 4A

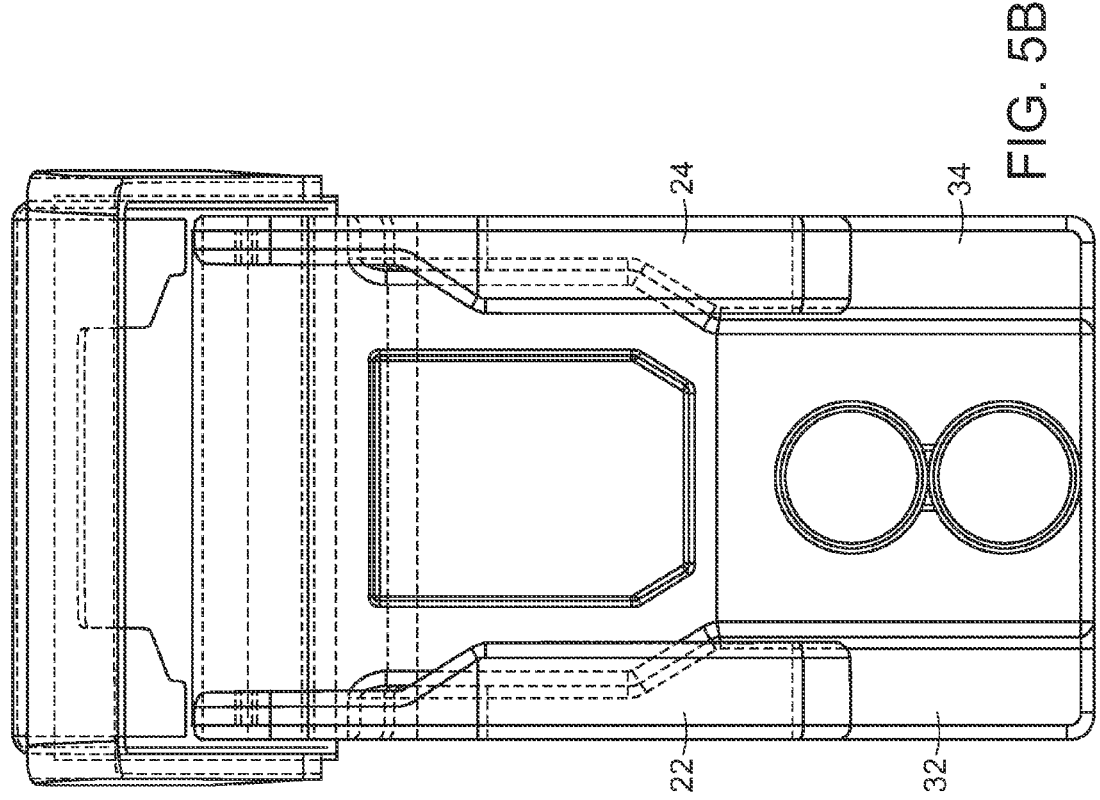
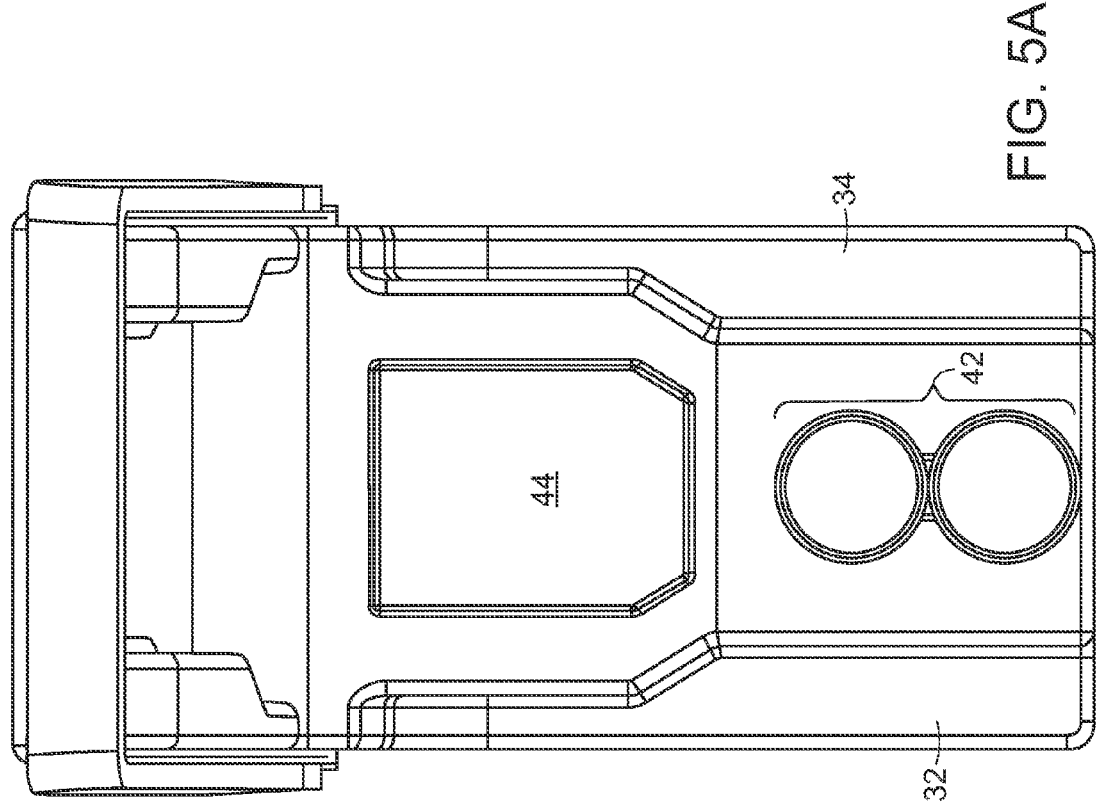

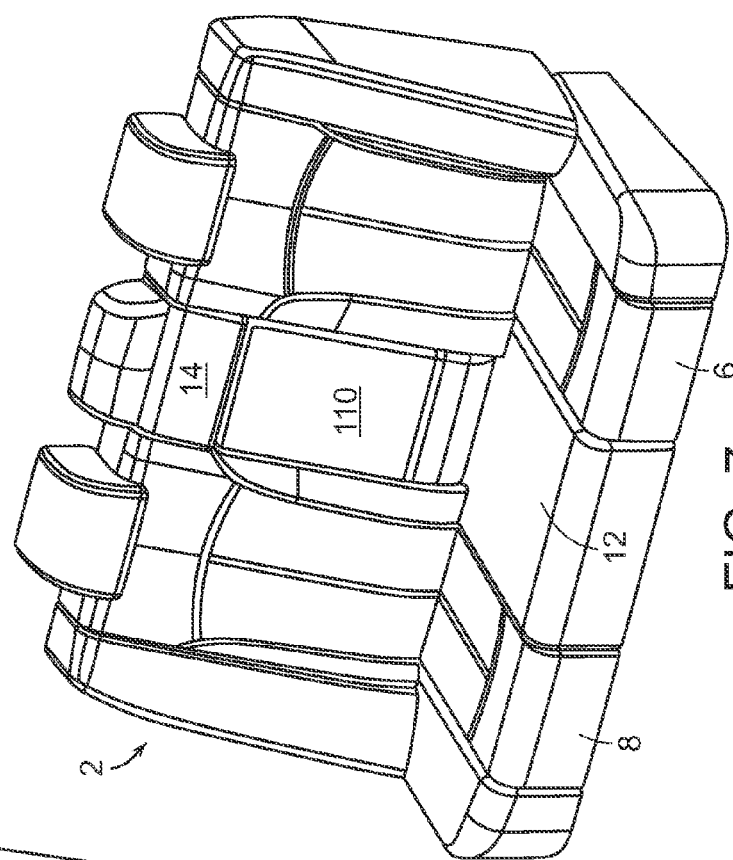
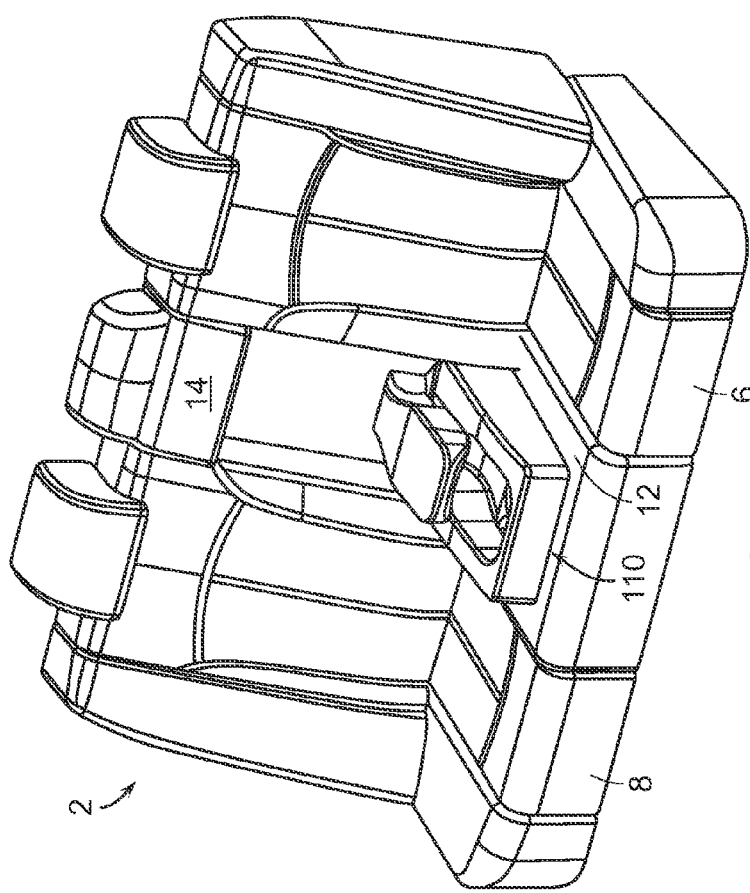

DUAL PIVOTING ARMREST ARRANGEMENT FOR MOTOR VEHICLE

FIELD OF INVENTION

The present invention relates to armrests for use in a motor vehicle, and more particularly to a dual pivoting armrest arrangement having at least upper and lower units pivotally attached to a seat back in the motor vehicle.

BACKGROUND OF THE INVENTION

Armrests are widely used in motor vehicles to provide comfort to occupants. Armrests conventionally are provided adjacent driver and passenger seats in the first or front row of a vehicle. Armrests also can be provided in additional rows of seats such as a second row, a third row, etc. In certain vehicles, such as sports utility vehicles (SUVs), vans, minivans, and crossover-type vehicles, it is becoming increasingly common to find multiple additional rows of seats.

Seats in the second row and third row, for example, may be positioned on either side of a center console. A "center console" as used herein generally refers to the area between two seats situated in a row of seats, and optionally may include a middle seat, or be convertible into a middle seat. To maximize comfort to occupants, armrests are provided on the center console or other area between the seats, and are usable by passengers seated in that row of seats. Because occupants can differ significantly in height (e.g., child and adult), they have different requirements regarding use of an armrest. Therefore, armrest arrangements in which a single armrest is fixed at a particular height may be of limited utility to certain occupants.

In many cases, it is desirable to provide armrests for use by occupants in driver-side and passenger-side seats in a second or third row of seats, but also allow for use of a middle seat, where the armrests are normally mounted.

It is known to provide armrests pivotally mounted to a seat back. A "seat back" as used herein generally refers to the area in a row of seats on or adjacent to the backing of a seat, which may be angled relative to the seat or seat cushion, where the seat back encompasses any interior or exterior portion of this backing, including side portions thereof. For example, a pivotable armrest may be rotated from a stowed position in which the armrest is generally flush with the seat back to a use position in which the armrest is moved to a position generally perpendicular to the seat back and parallel to the vehicle seat. However, such pivoting armrests suffer from several drawbacks. First, a pivotable armrest typically is supported by the seat back, and can be subjected to high forces when an occupant's arm is resting on the structure. As such, the attachment point of the armrest body with the seat back must be reinforced to tolerate these substantial forces. Second, because a pivotable armrest often is configured to fit within the seat back in the stowed position, the maximum size of the armrest is limited by the size of the seat back, and the resulting armrest may be smaller than desired, and thus limit occupant comfort. Third, a pivotable armrest generally has a single height during use, and thus cannot accommodate occupants of different heights.

Such pivotable armrests are usually installed in a "second row" or "third row" of seats, such that a center console over which the armrests are arranged in the use position also can serve as a middle seat when the pivotable armrest is arranged in the stowed position.

It would be desirable to provide an armrest pivotally mounted to a seat back in a second or third row of seats, such that the armrest can be stowed in the seat back, and capable of accommodating occupants of different heights during use, where the armrest is supported by the vehicle seat, instead of being substantially supported by the seat back.

SUMMARY OF THE INVENTION

An armrest arrangement is provided for use in a vehicle such as a motor vehicle, including but not limited to passenger vehicles such as cars, trucks, vans, minivans, sport utility vehicles (SUVs), crossover-type vehicles, and other types of vehicles. The armrest arrangement is configured to be installed in a row of seats of the vehicle, preferably on a center console between driver and passenger side seats, where the center console can serve as a middle seat when the armrest arrangement is stowed.

The armrest arrangement of the present invention includes a plurality of armrest units, preferably at least an upper armrest unit and a lower armrest unit, the armrest units being pivotally attached to a seat back, each armrest unit configured to move between a stowed position and a use position. The upper armrest unit substantially is supported by the lower armrest unit during use, and the lower armrest unit is supported by the vehicle seat, thereby providing adequate and appropriate support for the upper and lower armrest units in the seat area, while preventing the seat back from being subjected to excessive forces. In other words, the armrest arrangement of the present invention is substantially entirely supported by the vehicle seat, instead of the seat back. As used herein, the terms "seat" and "vehicle seat" are used interchangeably, and refer to the seat and any seat cushion(s), which are configured to receive an occupant in the seated position. The terms "seat" and "vehicle seat" are distinguished from "seat back," which generally refers to the area in a row of seats on or adjacent to the backing of a seat, and may be angled relative to the seat or seat cushion.

According to the present invention, an armrest of an appropriate height can be used by the occupant of an adjacent seat, that is, the occupant can move the lower armrest unit to the use position and thus utilize the lower armrest, while leaving the upper armrest unit in the stowed position, or alternatively, move both the lower and upper armrest units to the use position, in order to utilize the upper armrest, which would be supported on the lower armrest unit.

In particular, the armrest arrangement is configured to be installed in a second row, a third row, or any further row of seats in the vehicle, where the seats and/or seat backs are usually connected by a center console with or without a middle seat. However, the armrest arrangement can be installed in any row of seats having first and second outer seats, and a middle seat. For example, the driver-side seat and the passenger-side seat may be separated by a center console that also serves as the middle seat. Alternatively, it is possible for the driver-side seat and the passenger-side seat to be separated by a center console that includes one or more permanent fixtures, for example, drink holders, storage compartments, heating/ventilation units, etc.

According to a first preferred embodiment of the present invention, the armrest arrangement includes an upper armrest unit having a plurality of first bodies, each of the first bodies arranged adjacent to a respective seat, the first bodies each being rotatable between a stowed position and a use position. According to a second preferred embodiment, the upper armrest unit has a single first body configured to rotate between the stowed position and the use position. In each of the first and second embodiments, the armrest arrangement also includes at least one second body, preferably a plurality of second bodies rotatable between a stowed position and a use position. The one or more first bodies are configured to be supported by the second bodies during use, such that forces produced during use of the armrest arrangement substantially are absorbed by the lower armrest unit and the seat, instead of the seat back.

An armrest arrangement according to the present invention can include: a lower armrest unit pivotable between a use position and a stowed position in which the lower armrest unit is received in a seat back; and an upper armrest unit pivotable between a use position in which the upper armrest unit is supported by the lower armrest unit, and a stowed position in which the upper armrest unit is at least partially received in the lower armrest unit.

An armrest arrangement according to the present invention can include: a lower armrest unit configured to pivot between a use position in which the lower armrest unit is supported by a seat, and a stowed position in which the lower armrest unit is received in a seat back; and an upper armrest unit configured to pivot between a use position in which the upper armrest unit is supported by the lower armrest unit, and a stowed position in which the upper armrest unit is at least partially received in the seat back, such that when both the upper and lower armrest units are positioned in the stowed position, the upper armrest unit is at least partially received in the lower armrest unit.

Further, the upper armrest unit of the armrest arrangement of the present invention can include at least a first body arranged at a first height, and the lower armrest unit can include at least a second body arranged at a second height lower than the first height, where the second body includes a pivot point positioned lower than the first height for pivoting the second body between the use position and the stowed position.

A method of installing an armrest arrangement in a vehicle according to the present invention can includes steps of: providing a housing connected to a seat back of the vehicle; pivotally connecting a lower armrest unit to the housing, such that the lower armrest unit is pivotable between a use position in which the lower armrest unit is supported by a seat, and a stowed position in which the lower armrest unit is at least partially received in the seat back; and pivotally connecting an upper armrest unit to the housing, such that the upper armrest unit is pivotable between a use position in which the upper armrest unit is supported by the lower armrest unit, and a stowed position in which the upper armrest unit is at least partially received in the seat back, such that when both the upper and lower armrest units are positioned in the stowed position, the upper armrest unit is at least partially received in the lower armrest unit.

Other aspects and embodiments of the invention are discussed below.

BRIEF DESCRIPTION OF THE DRAWINGS

For a fuller understanding of the nature and desired objects of the present invention, reference is made to the following detailed description taken in conjunction with the accompanying drawing figures wherein like reference character denote corresponding parts throughout the several views and wherein:

FIG. 4A is a side view of the armrest arrangement of FIG. 3A;

FIG. 4B is a side view of the armrest arrangement of FIG. 3B;

FIG. 5A is a top view of the armrest arrangement of FIG. 3A;

FIG. 5B is a top view of the armrest arrangement of FIG. 3B;

FIG. 6 is a front perspective view of a row of seats incorporating an armrest arrangement according to a second preferred embodiment of the present invention in which upper and lower armrest units are provided in a use position;

FIG. 7 is a front perspective view of the armrest arrangement of FIG. 6, where the upper and lower armrest units are provided in a stowed position;

DETAILED DESCRIPTION OF THE INVENTION

An armrest arrangement is provided in at least one row of seats of a vehicle, the armrest arrangement being positioned between the seats and including a plurality of armrest units, preferably at least an upper armrest unit and a lower armrest unit, the armrest units being pivotally attached to a seat back, each armrest unit configured to move between a stowed position and a use position. The upper armrest unit substantially is supported by the lower armrest unit during use, and the lower armrest unit is supported by the seat, thereby providing suitable support for the upper and lower armrest units in the seat area, while preventing the seat back from being subjected to excessive forces. According to the present invention, an armrest of an appropriate height can be used by the occupant of an adjacent seat, that is, the occupant can move the lower armrest unit to the use position and thus utilize the lower armrest, while leaving the upper armrest unit in the stowed position, or alternatively, move both the lower and upper armrest units to the use position, in order to utilize the upper armrest, which would be supported on the lower armrest unit.

The armrest arrangement of the present invention can be provided in any row of seats of a vehicle, such as a motor vehicle. Such vehicles typically have one or more rows of seats, and can be passenger vehicles such as cars, trucks, vans, minivans, sport utility vehicles (SUVs), crossover-type vehicles, or other types of vehicles. The armrest arrangement is configured to be installed in a second row, a third row, or any further row of seats in the vehicle, where the seats and/or seat backs are usually connected by a center console with or without a middle seat. However, the armrest arrangement can be installed in any row of seats having first and second outer seats, and a middle seat. For example, the driver-side seat and the passenger-side seat may be separated by a center console that also serves as the middle seat. Alternatively, it is possible for the driver-side seat and the passenger-side seat to be separated by a center console that includes one or more permanent fixtures, for example, drink holders, storage compartments, heating/ventilation units, etc.

Figure 2:
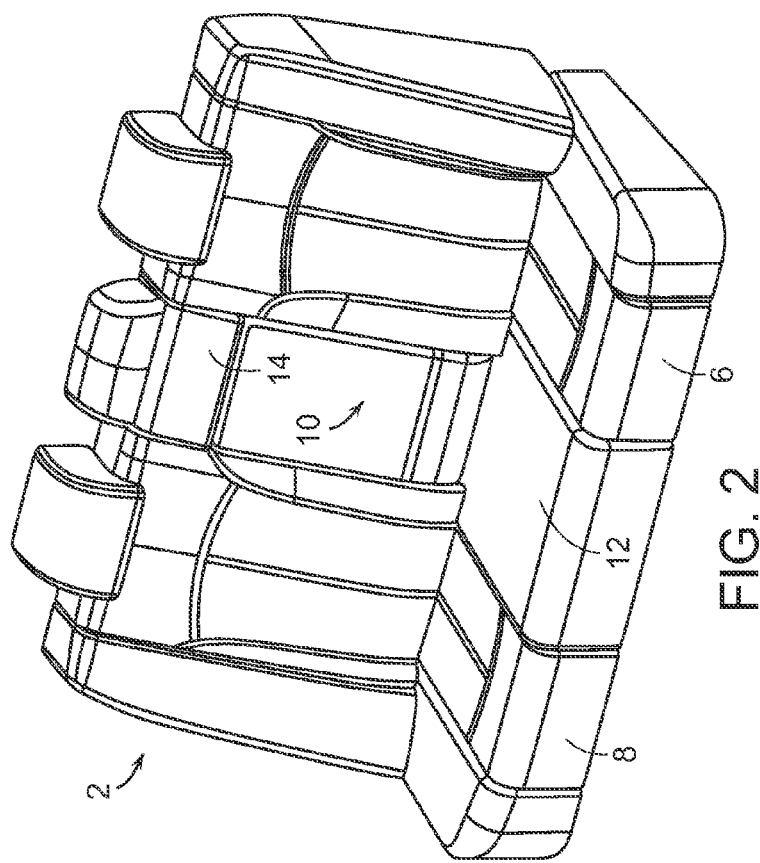
FIG. 2 is a front perspective view of the armrest arrangement of FIG. 1, where the upper and lower armrest units are provided in a stowed position.
Figure 1:
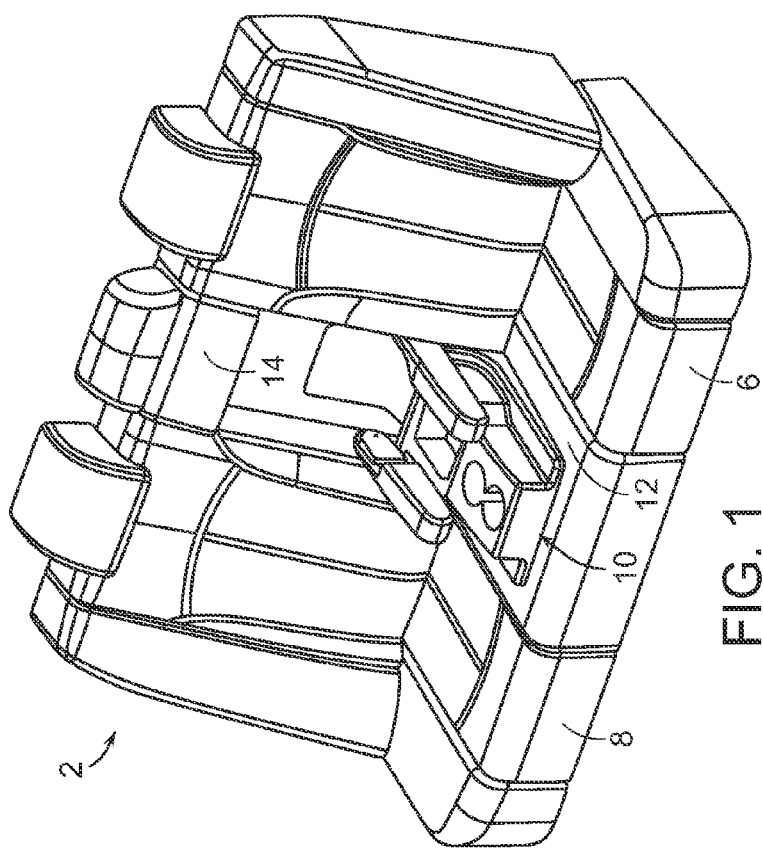
FIG. 1 is a front perspective view of a row of seats incorporating an armrest arrangement according to a first preferred embodiment of the present invention in which upper and lower armrest units are provided in a use position.

FIGS. 1 and 2 depict an armrest arrangement according to a first preferred embodiment of the present invention. In FIG. 1, an armrest arrangement 10 is positioned on or adjacent to a center console 12, the center console 12 also serving as a middle seat between a driver-side seat 6 and a passenger-side seat 8 in a row of seats 2. In FIG. 2, the armrest arrangement 10 is stowed in a seat back 14 of the center console 12. The terms "center console" and "middle seat" can be used interchangeably in situations where the center console also serves as a middle seat. The armrest arrangement of the present invention is configured to move between a use position (see FIG. 1) and a stowed position (see FIG. 2).

In the use position of FIG. 1, the armrest arrangement 10 has been pivoted downwardly from the seat back 14, such that upper armrests are usable by occupants of the driver-side seat 6 and the passenger-side seat 8. In other arrangements, one or more of the upper armrests can be pivoted upwardly into the seat back 14, such that lower armrests can be used by one or more of the occupants.

In the stowed position of FIG. 2, the armrest arrangement 10 has been stowed entirely within the seat back 14, thereby allowing the center console 12 to be used as a middle seat by an occupant of the middle seat. In this arrangement, the upper and lower armrests are not usable by occupants of the driver-side seat 6 and the passenger-side seat 8.

Figure 3A:
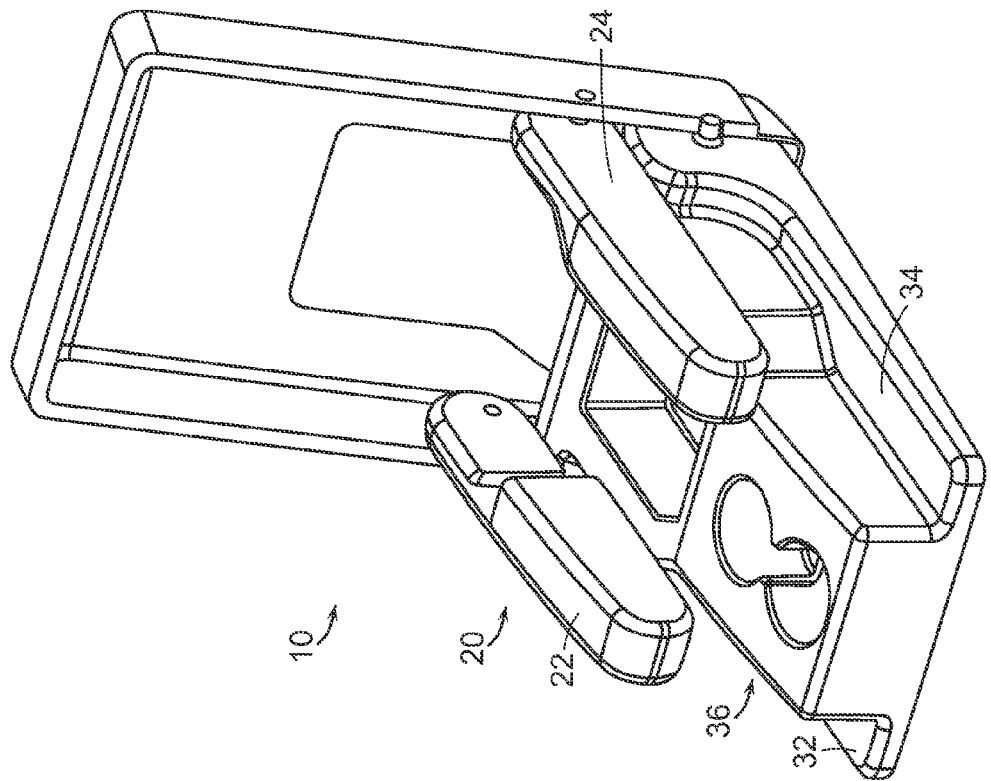
FIG. 3A is an isolated perspective view of the armrest arrangement of FIG. 1, where the upper armrest unit is provided in the stowed position.
Figure 3B:
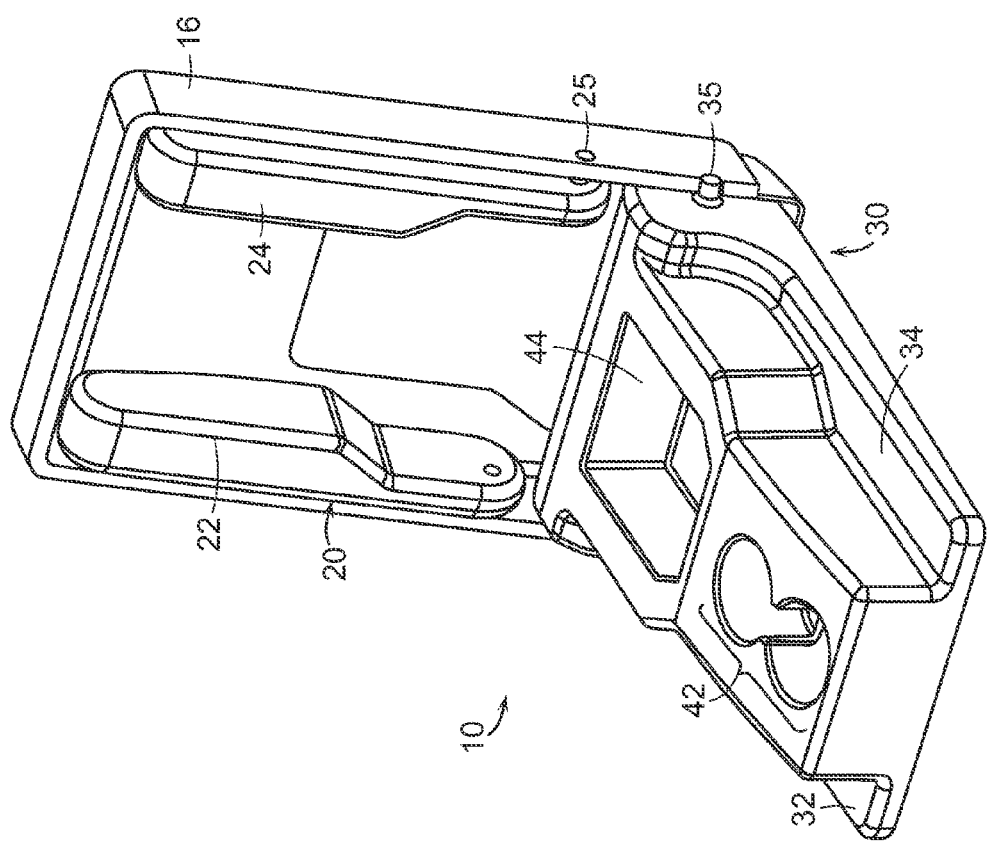
FIG. 3B is an isolated perspective view of the upper and lower armrest units of FIG. 1, where the upper armrest unit is provided in the use position.

The armrest arrangement 10 of FIGS. 1 and 2 is described in greater detail with reference to FIGS. 3A-3B, 4A-4B, and 5A-5B, which depict the armrest arrangement of the first preferred embodiment in isolation, i.e., removed from a center console in a row of seats. Referring to FIGS. 3A and 3B, an upper armrest unit 20 and a lower armrest unit 30 each are pivotally connected to an enclosure 16 configured to be received in the center console 12 in the row of seats 2. In particular, the enclosure 16 of the armrest arrangement 10 can be bolted or otherwise fixed to the seat back 14 of the center console 12. In certain embodiments, it is possible to omit the enclosure entirely, and attach the upper and lower armrest units directly to the seat back itself.

The enclosure 16 simply refers to a housing or other structure for containing the upper and lower armrest units of the armrest arrangement, and is not limited to any particular structure. The enclosure 16 should be sized appropriately to fit within the center console 12 of the seat back 14 in the row of seats 2. However, because of the particular arrangement of the upper and lower armrest units, the respective heights of the upper armrest unit 20 and the lower armrest unit 30 can be larger than the thickness of the seat back 14.

Referring again to FIG. 3A, the upper armrest unit 20 includes at least one first body or upper armrest, in this case, a pair of first bodies 22 and 24. As shown in FIG. 3A, the first bodies 22 and 24 are provided in a stowed position in which the first bodies 22 and 24 are at least partially contained within the enclosure 16. The first bodies 22 and 24 each include pivot points 25, where the first bodies 22 and 24 are separately pivotable between the stowed position shown in FIG. 3A and a use position shown in FIG. 3B. The pivot points 25 can include pin joints or pegs configured and arranged to operably connect the first bodies 22 and 24 to the enclosure 16. In certain embodiments, the pivot points 25 may be located at different areas of the enclosure 16, for example, a back area of the enclosure 16 instead of the sides as shown in FIGS. 3A-3B. Alternatively, in other embodiments, it is possible to omit the enclosure entirely, and attach the first bodies 22 and 24 directly to the seat back.

Although both first bodies 22 and 24 have been pivoted into the use position, as shown in FIG. 3B, it is possible for only one of the first bodies 22 and 24 to be in the use position, while the other of the first bodies 22 and 24 is in the stowed position. In the stowed position of FIG. 3A, the first bodies 22 and 24 are at least partially contained within the enclosure 16. When the lower armrest unit 30 is rotated into the stowed position, as shown in FIG. 2, the first bodies 22 and 24 are configured to be at least partially received in a cavity 36 defined on each side of the lower armrest unit 30 (see FIG. 3B).

Because of the relative location of the pivot points 25 and 35, and the geometries of the first and second bodies 22 and 24 relative to the cavities 36, the armrest arrangement as provided in the stowed position can at least partially receive the first bodies 22 and 24 in the respective cavities 36, and an outer portion of the enclosure 16 is generally flush with the seat back 14, such that the seat back 14 can be used as a middle seat. The particular arrangement of the upper and lower armrest units of the present invention allows the armrest units to be arranged at different heights to accommodate occupants of different heights, while still allowing the armrest arrangement to be stowed in the center console when the middle seat is occupied.

Although the upper armrest unit 20 includes two of the first bodies 22 and 24, the present invention encompasses armrest arrangements with only one first body, or more than two first bodies. In general, each first body should correspond to a seat adjacent to the upper armrest to be used by an occupant.

As shown in FIG. 3A, the lower armrest unit 30 includes at least one second body or lower armrest, in this case, a pair of second bodies 32 and 34, where each second body should correspond to an adjacent seat. Preferably the lower armrest unit 30 including both of the second bodies 32 and 34 is formed as a single integral piece which is rotatable between a stowed position (see FIG. 2) and a use position (see FIGS. 1 and 3A-5B). The second bodies 32 and 34 are arranged such that they are elevated above the height of the center console 12, and thus serve as armrests for shorter occupants, whereas the first bodies 22 and 24 are particularly arranged to accommodate taller occupants. The particular heights of the first and second bodies of the upper and lower armrest units, respectively, are a matter of design choice, and may be based on the heights of intended occupants.

The lower armrest unit 30 is pivotable about one or more pivot points 35, preferably at least one pivot point 35 on each side of the enclosure 16. Each pivot point 35 can include a pin joint or peg configured and arranged to operably connect the lower armrest unit 30 to the enclosure 16. In certain embodiments, the pivot points 35 may be located at different areas of the enclosure 16, for example, a back area of the enclosure 16 instead of the sides as shown in FIGS. 3A-3B. Alternatively, in other embodiments, it is possible to omit the enclosure entirely, and attach the second bodies 32 and 34 directly to the seat back.

The pivot points 35 of the second bodies 32 and 34 of the lower armrest unit 30 preferably are positioned at a height lower than the pivot points 25 of the first bodies of the upper armrest unit 20. In this manner, in the use position, the first bodies 22 and 24 of the upper armrest unit 20 are supported on the second bodies 32 and 34 of the lower armrest unit 30, which is supported on the seat portion of the center console 12, as shown in FIGS. 1 and 2. Also, in the stowed position, as described herein, the second bodies 32 and 34 of the lower armrest unit 30 are shaped such that the first bodies 22 and 24 can be at least partially received therein, thereby minimizing the thickness of the stowed armrest arrangement. It is noted that the armrest arrangement 10 is configured such that the lower armrest unit 30 must be in the use position in order for the upper armrest unit 20 to also be in the use position, in order for the first bodies 22 and 24 of the upper armrest unit 20 to be supported by the second bodies 32 and 34 of the lower armrest unit 30.

During use, the lower armrest unit 30 is configured to be supported on the center console, and thus is supported by the seat area in the row of seats, i.e., by the seat itself. The upper armrest unit 20 is supported on the lower armrest unit 30 during use, such that both the upper and lower armrest units are supported by the vehicle seat, and excessive forces are not generated and transferred to the seat back, but instead can be absorbed by the seat itself.

The lower armrest unit 30 further can be formed with one or more cup holders 42 and one or more storage compartments 44. When the lower armrest unit 30 is in the use position, as shown in FIGS. 1 and 3A-5B, the cup holders 42 and 44 can be used to receive appropriately sized beverages and other objects, and the storage compartments, only one of which is depicted, can be used to store various items.

FIGS. 6 and 7 depict an armrest arrangement according to a second preferred embodiment of the present invention, where the second preferred embodiment differs from the first preferred embodiment shown in FIGS. 1-5B in the arrangement of the upper and lower armrest units. In particular, the upper armrest unit in the second preferred embodiment includes a single upper armrest usable by occupants of both adjacent seats, which is configured to be at least partially received in a single cavity of the lower armrest unit in the stowed position.

In FIG. 6, an armrest arrangement 110 is positioned on or adjacent to the center console 12, which also serves as a middle seat between the driver-side seat 6 and the passenger-side seat 8 in the row of seats 2. In the use position of FIG. 6, the armrest arrangement 110 has been pivoted downwardly from the seat back 14, such that upper armrest is usable by occupants of the driver-side seat 6 and the passenger-side seat 8.

In FIG. 7, the armrest arrangement 110 is stowed in the seat back 14 of the center console 12. In the stowed position of FIG. 7, the armrest arrangement 110 has been stowed entirely within the seat back 14, thereby allowing the center console 12 to be used as a middle seat by an occupant of the middle seat. In this arrangement, the upper and lower armrests are not usable by occupants of the driver-side seat 6 and the passenger-side seat 8.

Figure 8B:
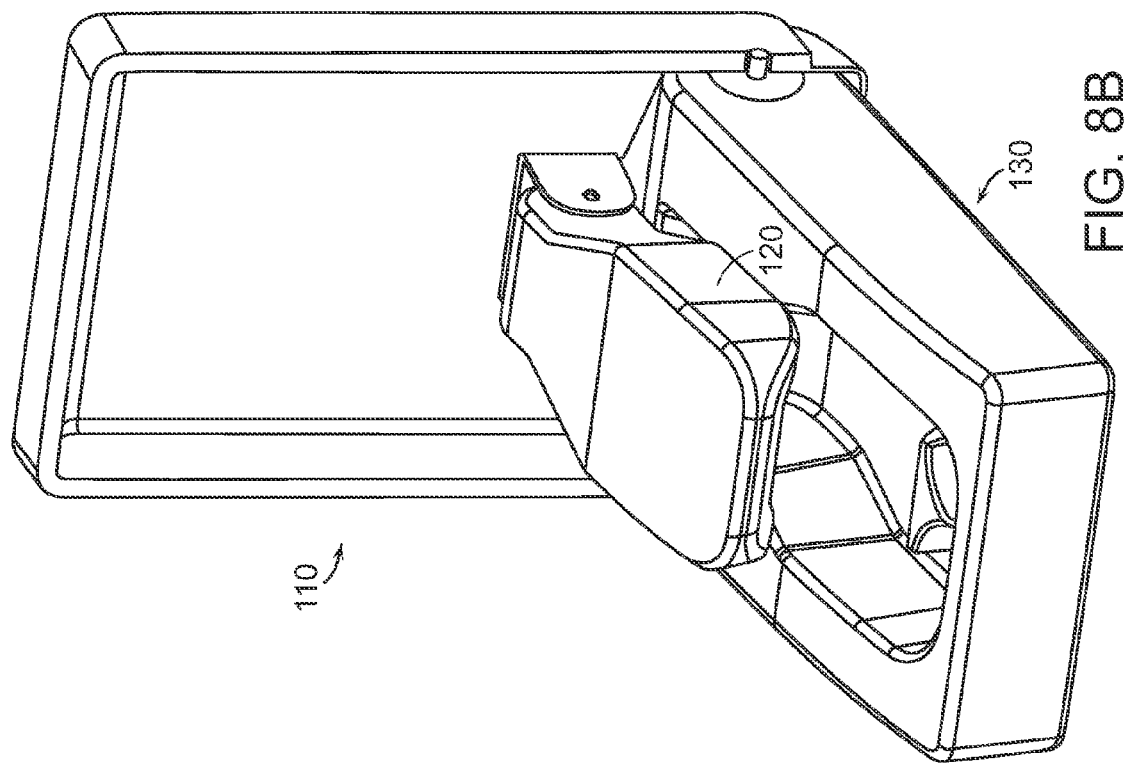
FIG. 8B is an isolated perspective view of the upper and lower armrest units of FIG. 6, where the upper armrest unit is provided in the use position.
Figure 8A:
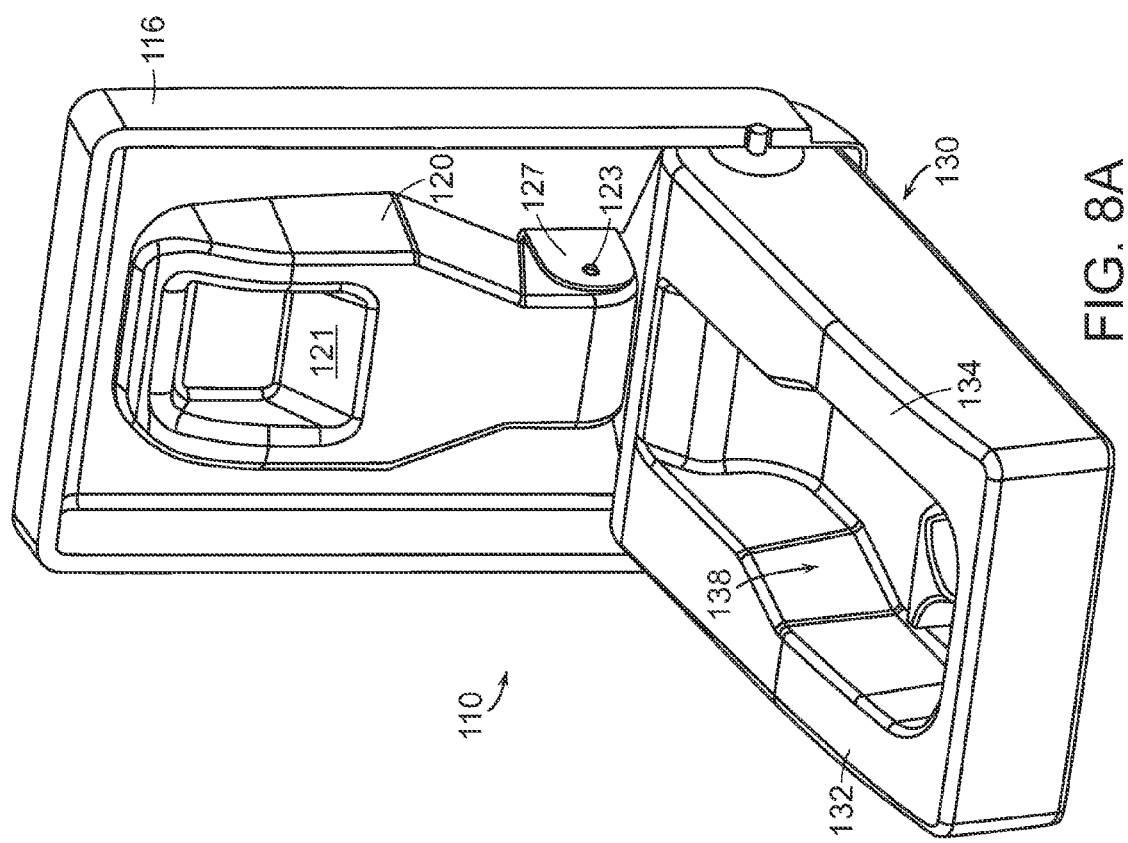
FIG. 8A is an isolated perspective view of the upper and lower armrest units of FIG. 6, where the upper armrest unit is provided in a stowed position.
Figure 9B:
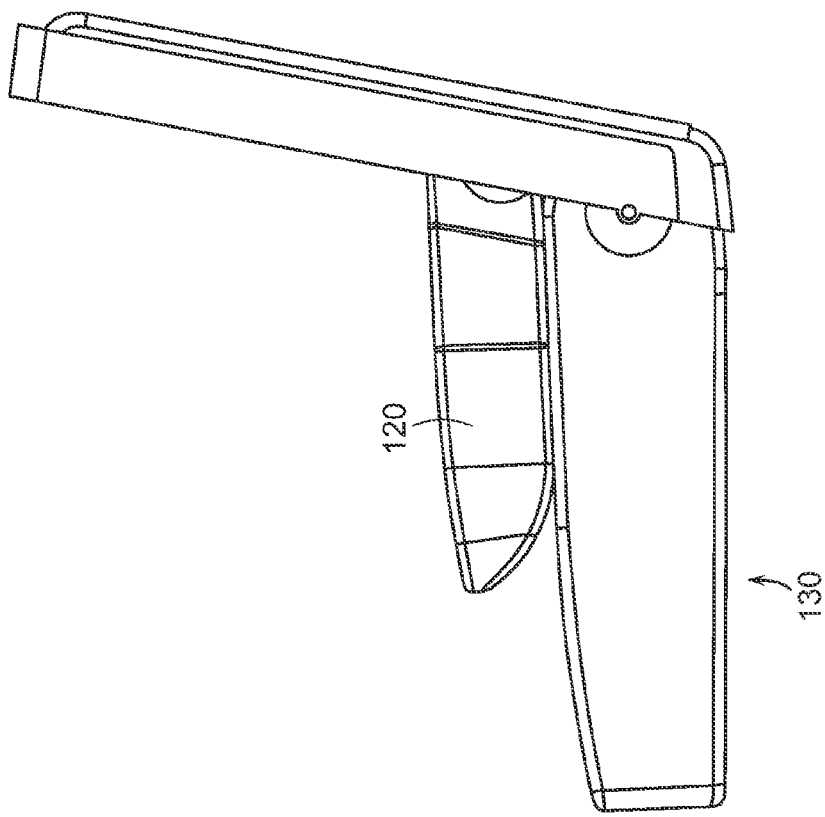
FIG. 9B is a side view of the armrest arrangement of FIG. 8B.
Figure 9A:
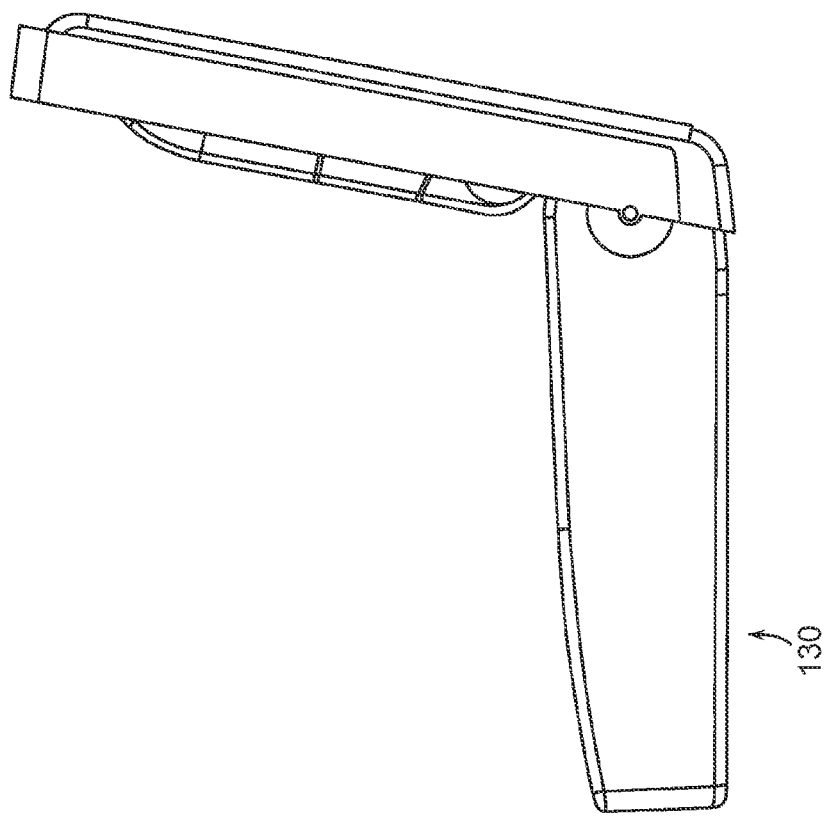
FIG. 9A is a side view of the armrest arrangement of FIG. 8A.
Figure 10B:
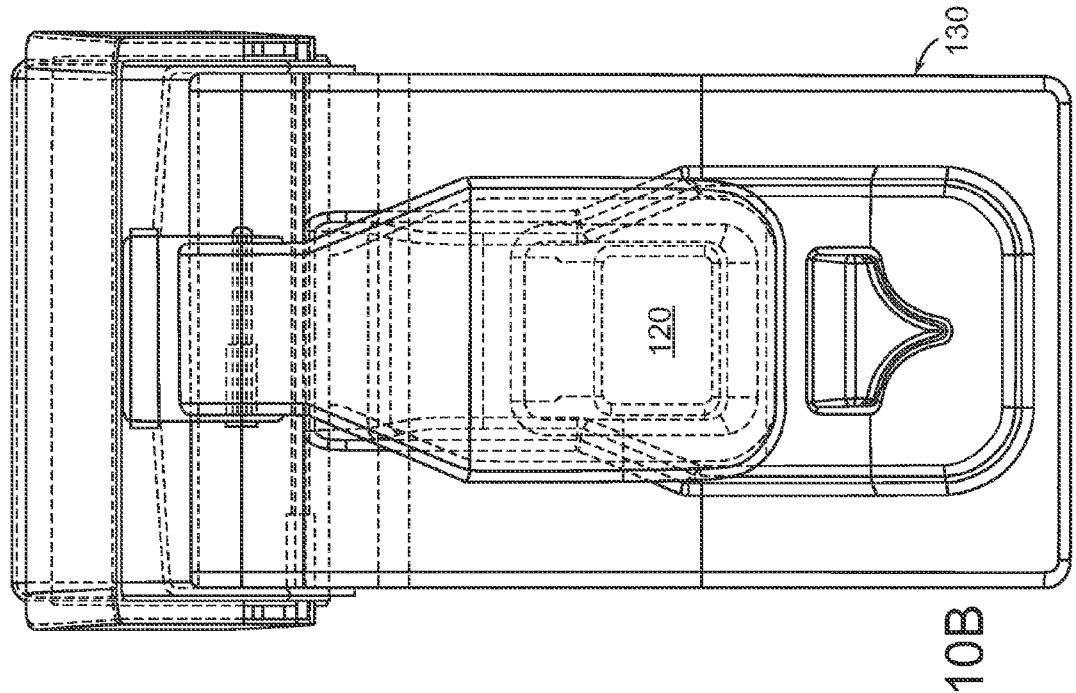
FIG. 10B is a top view of the armrest arrangement of FIG. 8B.
Figure 10A:
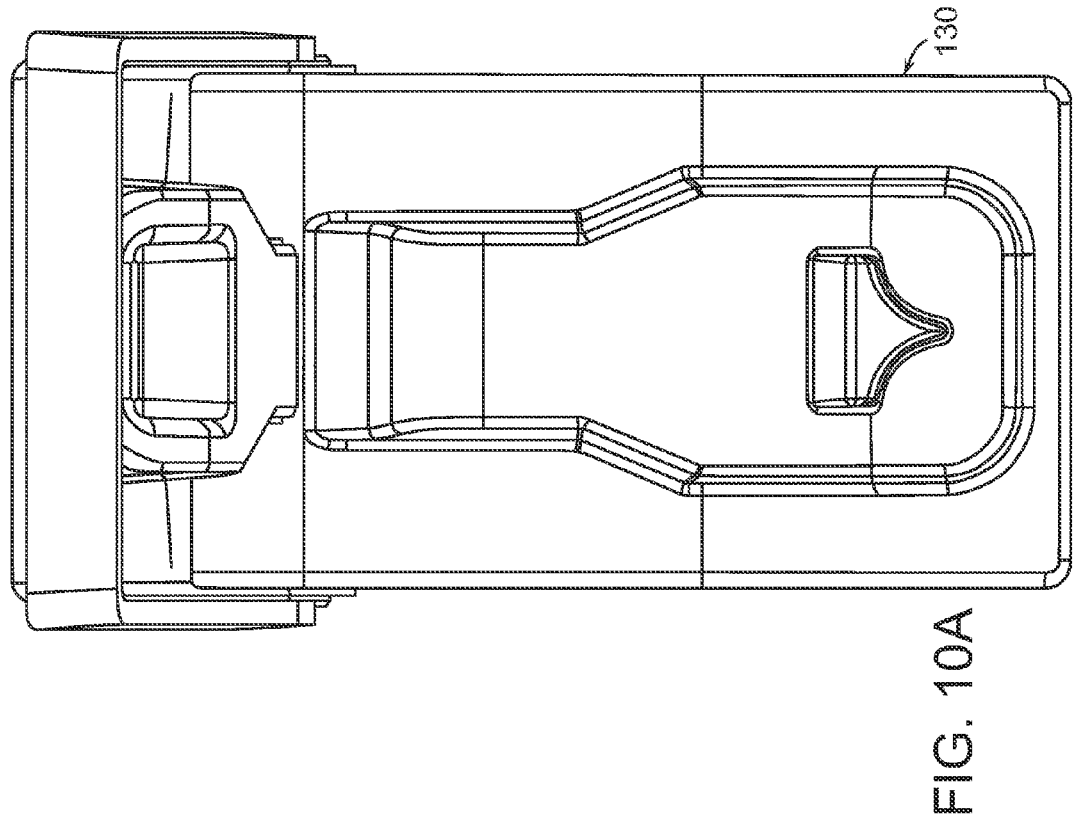
FIG. 10A is a top view of the armrest arrangement of FIG. 8A.

The armrest arrangement 110 of FIGS. 6 and 7 is described in greater detail with reference to FIGS. 8A-8B, 9A-9B, and 10A-10B. Referring to FIGS. 8A and 8B, an upper armrest unit 120 and a lower armrest unit 130 each are pivotally connected to an enclosure 116 configured to be received in the center console 12 in the row of seats 2. In particular, the enclosure 116 of the armrest arrangement 110 can be bolted or otherwise fixed to the seat back 14 of the center console 12. The enclosure 116 in the second preferred embodiment is similar to the enclosure 16 described above with respect to the first preferred embodiment, and may be modified or eliminated entirely in certain embodiments, as described above.

Referring again to FIG. 8A, the upper armrest unit 120 includes a single first body or upper armrest which can be shared by occupants of the adjacent seats. As shown in FIG. 8A, the first body (used interchangeably with "upper armrest unit" in this embodiment) 120 is provided in a stowed position in which the first body 120 is at least partially contained within the enclosure 116.

The first body 120 includes a pivot point 123, which is pivotable between the stowed position shown in FIG. 8A and a use position shown in FIG. 8B. The pivot point 120 is pivotable relative to a bracket 127 attached to the enclosure 116 to operably connect the first body 120 to the enclosure 116. When the lower armrest unit 130 is rotated into the stowed position, as shown in FIG. 7, the first body 120 is configured to be at least partially received in a cavity 138 defined by the lower armrest unit 130 (see FIG. 8B). The first body 120 also can include a cut-out portion 121 to reduce its thickness and thus enhance appearance.

As shown in FIG. 8A, the lower armrest unit 130 includes at least one second body or lower armrest, in this case, a pair of second bodies 132 and 134, where each second body should correspond to an adjacent seat. Preferably the lower armrest unit 130 including both of the second bodies 132 and 134 is formed as a single integral piece which is rotatable between a stowed position (see FIG. 7) and a use position (see FIGS. 6 and 8A-10B). The lower armrest unit 130 is pivotable about one or more pivot points, preferably at least one pivot point on each side of the enclosure 116.

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications and other references cited herein are hereby expressly incorporated herein in their entireties by reference.

What is claimed is:

1. An armrest arrangement, comprising:
   a lower armrest unit configured to pivot between a use position in which the lower armrest unit is supported by a seat, and a stowed position in which the lower armrest unit is received in a seat back; and
   an upper armrest unit configured to pivot between a use position in which the upper armrest unit is supported by the lower armrest unit, and a stowed position in which the upper armrest unit is at least partially received in the seat back, such that when both the upper and lower armrest units are positioned in the stowed position the upper armrest unit is at least partially received in the lower armrest unit,
   wherein the upper and lower armrest units are operably connected to an enclosure mounted in the seat back,
   the upper and lower armrest units each are directly pivotally connected to the enclosure mounted in the seat back,
   the upper armrest unit includes at least one first body arranged at a first height,
   the lower armrest unit includes a second body arranged at a second height lower than the first height, and
   the first body includes a pivot point positioned higher than the second height for pivoting the first body between the use position and the stowed position.

2. The armrest arrangement of claim 1, wherein the upper and lower armrest units are pivoted relative to the enclosure.

3. A motor vehicle seat comprising the armrest arrangement of claim 1.

4. A motor vehicle comprising the armrest arrangement of claim 1.

5. The armrest arrangement of claim 1, wherein the first body is supported by at least a portion of the second body when the second body is in the use position.

6. The armrest arrangement of claim 1, wherein the first body is received in a cavity of the lower armrest unit when both the upper and lower armrest units are in the stowed position.

7. The armrest arrangement of claim 1, wherein the lower armrest unit includes a cavity for receiving the upper armrest unit in the stowed position.

8. The armrest arrangement of claim 1, wherein the upper armrest unit includes a plurality of first bodies, each first body corresponding to an adjacent seat.

9. The armrest arrangement of claim 8, wherein the lower armrest unit includes a plurality of second bodies, each of the first bodies configured to be supported on a corresponding one of the second bodies.

10. An armrest arrangement comprising:
   a lower armrest unit configured to pivot between a use position in which the lower armrest unit is supported by a seat, and a stowed position in which the lower armrest unit is received in a seat back; and
   an upper armrest unit configured to pivot between a use position in which the upper armrest unit is supported by the lower armrest unit, and a stowed position in which the upper armrest unit is at least partially received in the seat back, such that when both the upper and lower armrest units are positioned in the stowed position the upper armrest unit is at least partially received in the lower armrest unit,
   wherein the upper and lower armrest units are operably connected to an enclosure mounted in the seat back,
   the upper and lower armrest units each are directly pivotally connected to the enclosure mounted in the seat back,
   the armrest arrangement is arranged between first and second seats in a vehicle, and
   the armrest arrangement is arranged on a center console between the first and second seats.

11. The armrest arrangement of claim 10, wherein the center console also serves as a middle seat when the upper and lower armrest units are in the stowed position.

12. The armrest arrangement of claim 10, wherein the lower armrest unit is supported on the center console when the lower armrest unit is in the use position.

13. The armrest arrangement of claim 12, wherein the upper armrest unit is supported on the lower armrest unit when the upper armrest unit is in the use position.

14. An armrest arrangement, comprising:
   a lower armrest unit pivotally connected to a seat back of a vehicle, the lower armrest unit being pivotable between a use position and a stowed position in which the lower armrest unit is received in the seat back; and
   an upper armrest unit pivotally connected to the seat back of the vehicle, the upper armrest unit being pivotable between a use position in which the upper armrest unit is supported by the lower armrest unit, and a stowed position in which the upper armrest unit is at least partially received in the lower armrest unit,
   wherein the upper and lower armrest units each are directly pivotally connected to the seat back,
   the armrest arrangement is arranged between first and second seats in a vehicle, and
   the armrest arrangement is arranged on a center console between the first and second seats.

15. The armrest arrangement of claim 14, wherein the upper and lower armrest units are operably connected to an enclosure mounted in the seat back.

16. The armrest arrangement of claim 14, wherein the upper armrest unit includes at least one first body arranged at a first height.

17. The armrest arrangement of claim 16, wherein the lower armrest unit includes a second body arranged at a second height lower than the first height.

18. The armrest arrangement of claim 17, wherein the first body includes a pivot point positioned higher than the second height for pivoting the first body between the use position and the stowed position.

19. The armrest arrangement of claim 17, wherein the first body is supported by at least a portion of the second body when the second body is in the use position.

20. The armrest arrangement of claim 17, wherein the first body is received in a cavity of the lower armrest unit when both the upper and lower armrest units are in the stowed position.

21. The armrest arrangement of claim 14, wherein the center console also serves as a middle seat when the upper and lower armrest units are in the stowed position.

22. The armrest arrangement of claim 14, wherein the lower armrest unit is supported on the center console when the lower armrest unit is in the use position.

23. The armrest arrangement of claim 22, wherein the upper armrest unit is supported on the lower armrest unit when the upper armrest unit is in the use position.

24. The armrest arrangement of claim 14, wherein the lower armrest unit includes a cavity for receiving the upper armrest unit in the stowed position.

25. The armrest arrangement of claim 14, wherein the upper armrest unit includes a plurality of first bodies, each first body corresponding to an adjacent seat.

26. The armrest arrangement of claim 25, wherein the lower armrest unit includes a plurality of second bodies, each of the first bodies configured to be supported on a corresponding one of the second bodies.

* * * * *